UNITED STATES PATENT OFFICE.

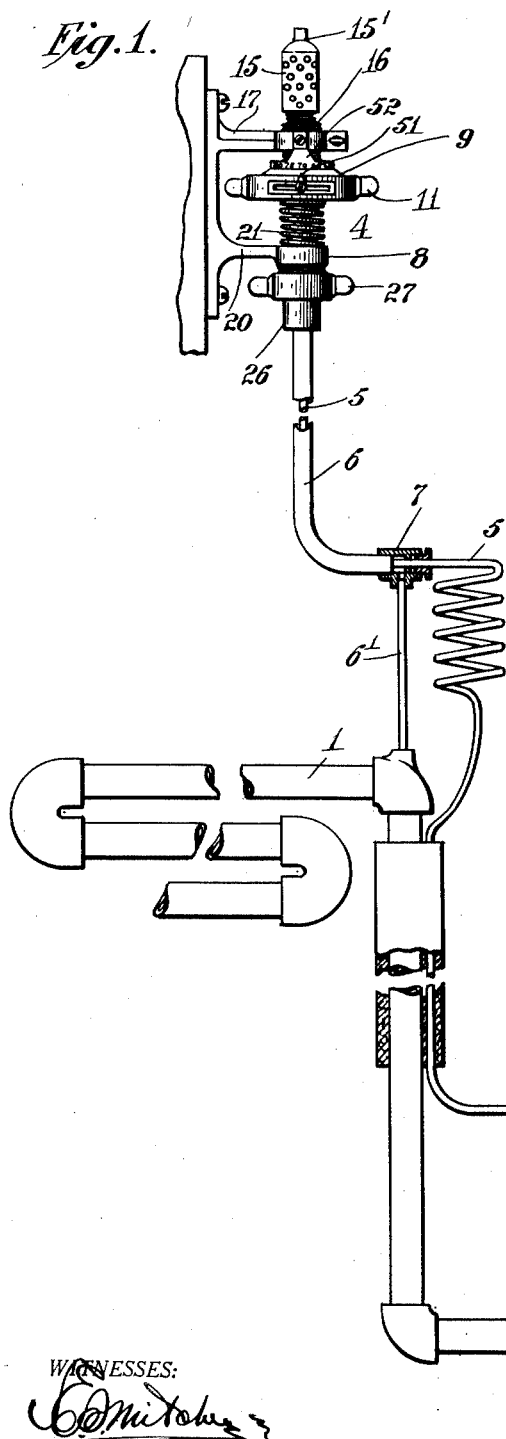
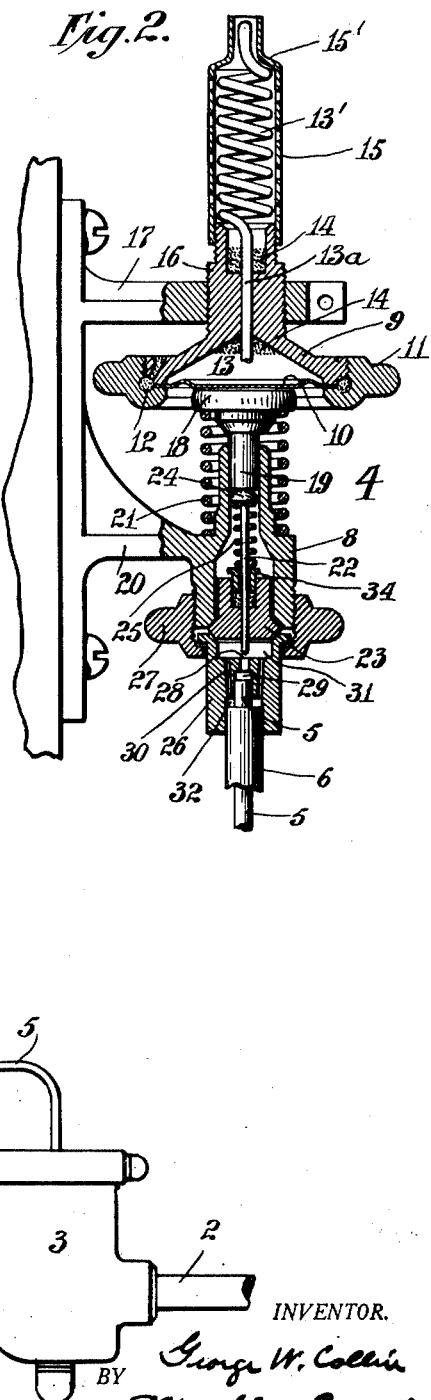

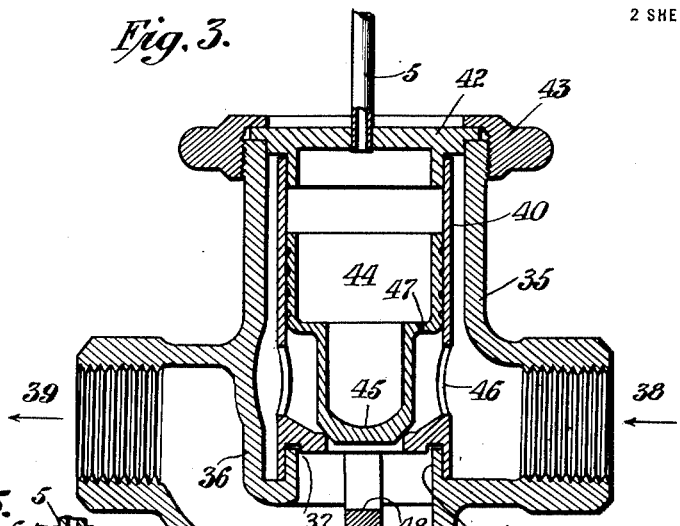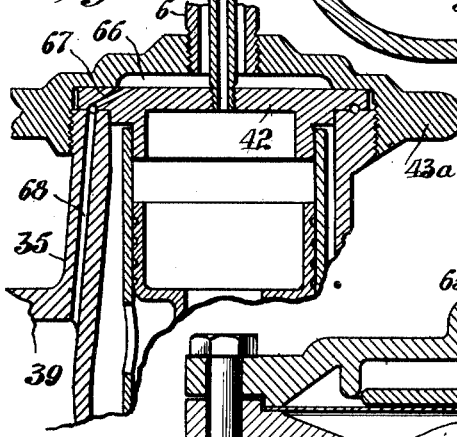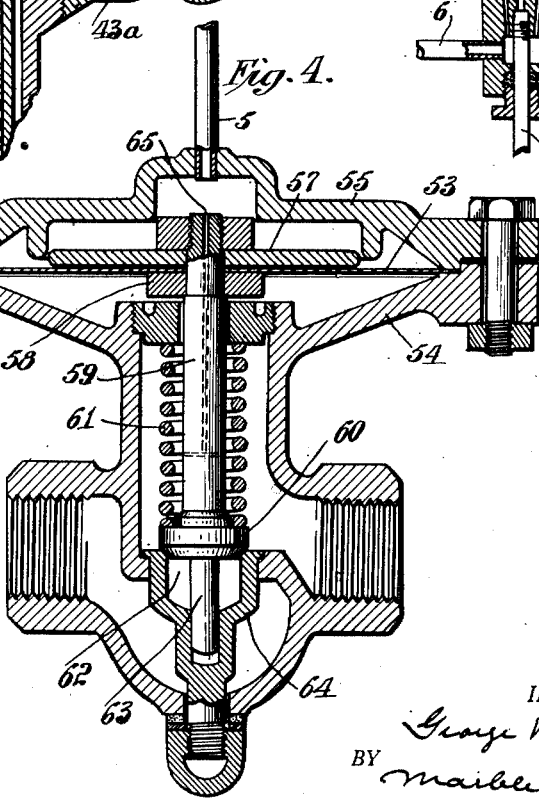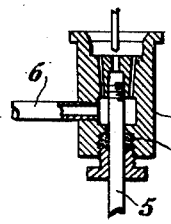

GEORGE W. COLLIN, OF BRIDGEPORT, CONNECTICUT.

THERMOSTATIC CONTROL DEVICE.

1,360,251.  Specification of Letters Patent.  Patented Nov. 23, 1920.

Application filed May 5, 1917. Serial No. 166,550.

*To all whom it may concern:*

Be it known that I, GEORGE W. COLLIN, a citizen of the United States of America, and a resident of Bridgeport, Fairfield county, State of Connecticut, have invented Thermostatic Control Devices, of which the following is a specification.

My invention relates to improvements in thermostatic control devices, and particularly to means for the control of flow of heating fluid, such as steam, through heating pipes, coils, jackets, chambers, etc. My invention comprises means for the distant control, through a fluid-pressure conduit, of a shut-off valve itself controlling the flow of the heating fluid to the heating pipes, coils, jackets, chambers, etc. It also comprises a novel thermostatic control device comprising a pilot valve for the main shut-off valve, and temperature-influenced fluid-pressure means for operating said pilot valve when changes of temperature occur.

My invention also comprises other features pointed out hereinafter.

The objects of my invention are to improve and simplify thermostatic control devices; to avoid the complication and more or less uncertainty of operation of electric control devices while preserving the facility for distant control characteristic of certain forms of electric control devices; to obtain direct and positive action of the control devices, together with simplicity of construction; and to provide for easy adjustment of action.

I will now proceed to describe my invention with reference to the accompanying drawings, in which one type of control apparatus embodying my invention is illustrated, and will then point out the novel features in claims. In said drawings:

Figure 1 shows, more or less diagrammatically, an elevation of a heating apparatus of the steam-coil type provided with a shut-off valve and distant-control thermostatic means embodying my invention, portions of the apparatus being shown in section.

Fig. 2 shows a central vertical section, on a larger scale, of the thermostatically-controlled pilot valve of Fig. 1.

Fig. 3 shows a central vertical section of a fluid-pressure-operated shut-off valve of the piston type, adapted for use in the system of Fig. 1 and adapted for control by the thermostatically-operated pilot valve of Fig. 2.

Fig. 4 shows a central vertical section of a fluid-pressure-operated shut-off valve of the diaphragm type likewise adapted for use in the system of Fig. 1 and adapted for control by the pilot valve of Fig. 2.

Fig. 5 is a fragmentary central vertical section of the upper portion of a shut-off valve similar to that shown in Fig. 3, showing a construction which may be employed when it is desired that the waste pipe 6 shall be connected to the shut-off valve for waste-return to the system; and Fig. 6 is a fragmentary central vertical section of the connecting nipple of the thermostatic control valve, and associated parts, showing an alternative arrangement for the connection of the supply and waste pipes 5 and 6, respectively, to that nipple.

Referring first to Fig. 1: numeral 1 designates a heating pipe or coil to which steam is supplied through a supply pipe 2, flow to pipe or coil 1 being controlled by a shut-off valve 3. 4 designates a thermostatically-controlled pilot valve, the construction of which is shown in Fig. 2; and 5 designates a small pipe or conduit connecting the actuating means of valve 3 to the controlling valve 4, while 6 designates a waste conduit through which fluid which passes the control valve 4 may be discharged into the main heating pipe, coil, etc., 1. Conveniently, pipes 5 and 6 may be located one within the other for a great portion of the distance between the shut-off valve and the thermostatic control valve, as shown in Fig. 1. When it is necessary or convenient to lead the two pipes separately, as for example, when the waste pipe 6 must be connected to some point of discharge, such as the heating pipe 1, a three-way fitting 7 is connected to the outer pipe, (waste pipe 6, in this case), the inner pipe (connecting pipe 5 in this case) extending through the fitting; another pipe 6' (forming a continuation of the outer pipe 6) leading out from the side of the fitting to the point of discharge. Even then, a considerable portion of the pipe 5 may usually be led along the pipe 1, and incased within the usual lagging commonly provided to cover the pipe 1 from the shut-off valve to the point at which heat is intended to be radiated. The two pipes 5 and 6' may each be of less than oneeighth inch external diameter, and it will be apparent, therefore, that such two pipes may be disposed quite inconspicuously; while, where the two conduits are concentric, the outer pipe 6 need not have an external diameter much, if any, greater than one-quarter of an inch, so that the two concentrically arranged conduits may also be disposed quite inconspicuously. The pipe connections between the thermostatic control valve and the shut-off valve and point of waste discharge are such, therefore, that the system is well adapted for regulation of car heating, house heating, etc. In principle, it does not matter whether pipe 5 or pipe 6 be the outer pipe, when such two pipes are concentrically arranged. Also, the concentric arrangement of these two pipes is a mere matter of convenience, and if desired these two pipes may be entirely separate one from the other.

The thermostatic control valve, 4, comprises a pilot-valve casing 8; a diaphragm chamber casing 9, and various other parts, to be described presently. A flexible diaphragm 10, preferably of metal, is held between the end face of casing 9 and a screw clamping ring 11; and the joint around the diaphragm is made tight by suitable means, as for example by pouring in molten lead or other suitable sealing material, 12. From the diaphragm chamber proper 13 a small-bore pipe 13ᵃ leads through a tightly closed aperture of the casing 9, and, conveniently, above this casing 9 such pipe 13ᵃ is coiled into a helix 13'. The joint between casing 9 and pipe 13ᵃ is made fluid tight by suitable means, as for example, by flowing molten lead or other suitable sealing material 14 around the pipe 13ᵃ in the vicinity of the joint. In the assembling of this control device, after the sealing-in of the diaphragm and pipe 13ᵃ, as described, the diaphragm chamber and coil 13' are filled with a suitable liquid which volatilizes at a temperature approximating that to be maintained, and then the coil 13' is sealed tightly at the top. It is then covered by a perforate cover 15, which screws up and down on the casing 9, and has a contracted upper portion 15' bearing against the upper end of the coil 13'. By screwing this cover 15 down, the coil 13' is compressed like a spring, and its fluid capacity thereby reduced. In this way the capacity of the coil 13' and chamber 10 may be standardized after sealing. Another way to standardize the capacity of these parts after sealing is to pinch the pipe of coil 13' slightly, preferably near its upper end, as by means of pliers.

The diaphragm-chamber casing 9 has a screw-threaded hub 16 fitting within a suitable bore of a supporting bracket 17. The purpose of this will be explained presently.

Beneath the diaphragm 10 is a diaphragm-hub 18 having a stem 19 working in a suitable guide of the pilot-valve casing 8; such casing 8 also having a supporting bracket 20 preferably integral with bracket 17. A spring 21 presses the hub 18 against the diaphragm. Within the casing 8 there is a needle valve 22 guided by passing through a guide-aperture in a block 23, supported within the casing 8, as hereinafter described; said needle valve having a head 24 pressed against the lower end of guide stem 19 by a spring 25. A connection-nipple 26 is held to the lower end of casing 8 by a clamping-screw ring 27. This nipple has a seat 28 for the needle valve 22, and to the port 29 leading to this valve seat is connected one of the pipes 5 and 6 (in this case, pipe 5). To the space, within nipple 26, surrounding such pipe so connected to the needle-valve port, is connected the other of pipes 5 and 6 (pipe 6, in this case). One or more ports 30 lead from the space 31 between nipple 26 and block 23 to the space 32 connecting with pipe 6. It will be apparent that with needle valve 22 raised from its seat, flow may occur from pipe 5, through port 29 and ports 30, to pipe 6; while when the needle valve is seated, such flow may not occur.

Within the block 23 there is a suitable packing space, and a packing gland 34 whereby leakage around the needle valve is minimized.

Referring now to Figs. 3 and 4, showing two types of shut-off valve which may be used in connection with the fluid-pressure distant-control means just described:

35 in Fig. 3 designates a valve casing having the usual bridge wall 36 with port 37 therein, and having the usual inlet connection 38, and the usual outlet connection 39. Within this valve casing there is a cylinder 40 fitted closely around the rim 41 surrounding the port 37, and held seated by a top plate 42, itself held to the casing 35 by a threaded clamping ring 43. Within this cylinder 40 there is a combined valve clapper and piston 44, the clapper portion 45 of this structure being of smaller diameter than the piston; in other words, the piston proper is an annular piston. Ports 46 in the side of cylinder 40 afford direct communication for steam or fluid under pressure from the inlet 38 to said annular piston, and also to the port 37, when the piston and valve clapper are raised. In the piston 44 there is a small-bore port 47 permitting gradual flow of working fluid to the space in said cylinder above the piston, and pipe 5, previously mentioned, leads from this space above the piston to the pilot valve structure, as previously described. It will be apparent that, with the needle valve 22 seated, so that pipe 5 is closed at its upper end, pressure accumulated above the piston 44 will hold the valve 45 seated; port 37 being then closed, therefore. But when needle valve 22 is raised from its seat, so that flow can occur through pipe 5 to pipe 6, and thence to waste, piston 44 and its valve clapper 45 will be raised by the pressure on the under side of said piston, permitting flow through port 37 of the valve pipe 1. Seating of the needle valve 22 again will cause the piston to descend and will cause the valve clapper 45 to close the port 37.

Cylinder 40 is held in place not only by the clamping ring 43 at the top, but also by a stem 48, integral with the cylinder 40, and extending through a suitable opening in the bottom of the valve casing 35 and there screw threaded; a holding nut 49, screwing on to this screw threaded portion of the stem 48 being provided, and suitable packing material 50 being interposed between the nut 49 and the bottom of the valve casing 35, so as to form a tight joint.

In the operation of the system shown in Figs. 1, 2, and 3, when, through lowering of the temperature in the region of the coil 13', the pressure in diaphragm chamber 13 is reduced, spring 21 will raise the diaphragm-hub 18, permitting spring 25 to raise the needle valve 22, and so to permit flow from the chamber in shut-off valve 3 above its piston 44, through pipes 5 and 6, to waste; piston 44 being then raised by the pressure on the underside of such piston and flow occurring through shut-off valve 3 to pipe 1. When, as a result of rise of temperature, in the vicinity of coil 13', the pressure in the diaphragm 13 is increased and the needle valve 22 is thereby seated, thus shutting off escape via pipe 5 from the chamber above piston 44, valve clapper 45 is seated as a result of building up of pressure above piston 44, and the flow into pipe 1 ceases. In practice, with temperature conditions such that more or less heat should be radiated from pipe 1, the automatic mechanism described will adjust the position of valve clapper 45, so that the port 37 will be open to just the degree required to maintain the desired temperature.

Referring again for a moment to Fig. 1: the clamping ring 11 is provided with an adjustable pointer 51, and above this pointer is a graduated index plate 52. By rotating the clamping ring 11, the entire diaphragm chamber casing 9 and associated parts may be screwed up or down, more or less, in bracket 17, and thereby the device may be regulated as desired to maintain the desired temperature.

The diaphragm valve shown in Fig. 4 is, in general, similar in construction to the piston valve shown in Fig. 3, except for the substitution of a diaphragm 53 for the piston 44 of Fig. 3; the form of the valve casing 54, and its cover plate 55, being modified accordingly. The diaphragm 53 is clamped, in the usual manner, between the casing 54 and the cover plate 55. This diaphragm is also clamped between a diaphragm hub 57 and a washer 58, both mounted on a stem 59 carrying the valve clapper 60, a spring 61 tending to hold that valve clapper so as to close valve port 62. The stem 59 has a guide projection 63 working in a suitable guide aperture of the valve seat spider 64. The pipe 5 connects to the cover plate 55. The stem 59 is provided with a duct 65 leading from the space above valve clapper 60 to the space above the diaphragm 56. It will be obvious that this diaphragm valve shown in Fig. 4 operates in the same manner as the piston-type valve shown in Fig. 3, the diaphragm valve being particularly suitable for use where the pressures of the actuating steam are low.

Instead of connecting the waste pipe 6, by fitting 7 and continuation 6', to the heating pipe 1, as shown in Fig. 1, said waste pipe may be continued back to the shut-off valve 3, as indicated in Fig. 5. In such case, the top clamping ring of the valve, which clamping ring is here designated by numeral 43ª, may extend over the cover plate 42 and there may be a space 66 between said clamping ring and cover plate, to which space 66 the pipe 6 connects; and there may be a duct 67 in the cover plate, connecting with a duct 68, in the side of the valve casing 35, and leading to the discharge connection 39 of the valve casing. When this construction is employed, pipes 5 and 6 may, conveniently, be concentric throughout. As an alternative to the method of connection of pipes, 5 and 6, to connecting nipple 26, shown in Fig. 2, the pipe 5 may, as shown in Fig. 6, pass through a stuffing box 69 at the lower end of the connecting nipple, here designated by numeral 26ª, and which pipe 6 may connect to the side of this connecting nipple.

As will be seen from reference to Fig. 2, the guide block 23 is held in place by the connecting nipple 26, itself held in place by the clamping ring 27, as previously stated.

What I claim is:

1. A thermostatic control device comprising a valve casing and a valve seat and a valve proper therefor, a flexible-walled chamber containing an expansible fluid, spring means for resisting expansion of said fluid with respect to the said flexible wall, means actuated by movement of such flexible wall due to expansion of such fluid tending to seat said valve proper, and spring means tending to move said valve proper against the expansive influence of such fluid, said chamber having a pipe-coil extension, and means for compressing such pipe-coil and thereby reducing its capacity.

2. A thermostatic control device comprising a valve casing and a valve seat and a valve proper therefor, a flexible-walled chamber containing an expansible fluid, spring means for resisting expansion of said fluid with respect to the said flexible wall, means actuated by movement of such flexible wall due to expansion of such fluid tending to seat said valve proper, and spring means tending to move said valve proper against the expansive influence of such fluid, said chamber having a pipe-coil extension, and a cover surrounding said pipe-coil, and having a screw-thread connection to said flexible-walled chamber, and having also means for compressing said pipe-coil when said cover is screwed down upon said chamber.

3. A thermostatic control device comprising an actuating element and a control valve, and a support for said actuating element and control valve arranged to hold the two in coöperative relationship, said control valve comprising a valve casing, a connection nipple removably secured thereto, and having in it supply and waste ports, and a valve proper arranged to be actuated by said actuating element toward a seating position, and provided with means for actuating it in the opposite direction, said valve proper arranged, when seated, to shut off communication between said supply and waste connections.

In testimony whereof I have signed this specification in the presence of two subscribing witnesses.

GEORGE W. COLLIN.

Witnesses:
W. E. BURNHAM,
EDWARD LYNCH.